US009514899B2

(12) United States Patent
Blackwood

(10) Patent No.: US 9,514,899 B2
(45) Date of Patent: Dec. 6, 2016

(54) CONTROL SWITCH WITH INTEGRATED RFID TAG

(71) Applicant: Eaton Corporation, Cleveland, OH (US)

(72) Inventor: Andrew James Blackwood, Waukesha, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/697,801

(22) Filed: Apr. 28, 2015

(65) Prior Publication Data

US 2016/0189888 A1 Jun. 30, 2016

Related U.S. Application Data

(63) Continuation-in-part of application No. 14/584,118, filed on Dec. 29, 2014.

(51) Int. Cl.
| | |
|---|---|
| *H01H 9/54* | (2006.01) |
| *G06K 7/10* | (2006.01) |
| *H01H 9/02* | (2006.01) |
| *H01H 9/16* | (2006.01) |
| *H01Q 1/22* | (2006.01) |
| *H01H 21/28* | (2006.01) |
| *H04B 5/00* | (2006.01) |

(52) U.S. Cl.
CPC ............ *H01H 9/54* (2013.01); *G06K 7/10316* (2013.01); *G06K 7/10366* (2013.01); *H01H 9/0271* (2013.01); *H01H 9/168* (2013.01); *H01Q 1/2208* (2013.01); *H01H 21/28* (2013.01); *H01H 2300/032* (2013.01); *H04B 5/0062* (2013.01)

(58) Field of Classification Search
CPC .............. G06K 19/0723; G06K 7/0008; G06K 7/10297; G06K 19/07749; G06K 7/10356; G06K 7/10366; G06K 17/0022
USPC ........................................................ 340/10.5
See application file for complete search history.

(56) References Cited

U.S. PATENT DOCUMENTS

| | | | |
|---|---|---|---|
| 5,093,929 A | 3/1992 | Stolarczyk et al. | |
| 6,618,022 B2 * | 9/2003 | Harvey | H01H 9/167 340/572.7 |
| 6,903,662 B2 * | 6/2005 | Rix | G06F 3/0202 340/10.6 |
| 7,138,914 B2 * | 11/2006 | Culpepper | G08B 21/0269 340/539.13 |

(Continued)

FOREIGN PATENT DOCUMENTS

| | | |
|---|---|---|
| EP | 0380314 A1 | 8/1990 |
| GB | 307941 A | 10/1962 |

*Primary Examiner* — Mark Blouin
(74) *Attorney, Agent, or Firm* — Ziolkowski Patent Solutions Group, SC

(57) ABSTRACT

A control system for controlling operation of a field device includes a switch having a switch contact movable between an off position and an activated position, a radio frequency identification (RFID) tag integrated with the switch and in selective communication with the switch based on the position thereof, an RFID reader configured to receive switch messages from the RFID tag that indicate an operational state of the switch, and a control circuit configured to receive switch messages from the RFID reader, the control circuit receiving the switch messages for purposes of controlling the field device.

18 Claims, 6 Drawing Sheets

(56) References Cited

U.S. PATENT DOCUMENTS

| | | | |
|---|---|---|---|
| 7,283,046 B2* | 10/2007 | Culpepper | B60R 25/102 340/539.13 |
| 7,292,159 B2* | 11/2007 | Culpepper | G08B 21/0269 340/539.13 |
| 7,782,202 B2* | 8/2010 | Downie | G02B 6/3895 340/10.1 |
| 8,618,914 B2* | 12/2013 | Bachman | G06K 19/0702 338/13 |
| 9,208,306 B2* | 12/2015 | Davis | G06F 1/1626 |
| 2005/0116021 A1 | 6/2005 | O'Dougherty et al. | |
| 2010/0079289 A1 | 4/2010 | Brandt et al. | |

* cited by examiner

CONTROL SWITCH WITH INTEGRATED RFID TAG

CROSS-REFERENCE TO RELATED APPLICATION

The present invention is a continuation-in-part of and claims priority to U.S. Ser. No. 14/584,118, filed Dec. 29, 2014, the disclosure of which is incorporated herein by reference in its entirety.

Embodiments of the present invention relates generally to electrical switches for use in motor vehicles and, more particularly, to vehicle switches having a self-identifying switch function. The self-identifying feature of the switches enables the placement of switches in any of a number of locations consistent with a customer's desired switch customization requirement, while providing for the identification of a switch regardless of its location, such that switches can be placed in any position within a defined network on the vehicle without changing the switch's functionality or the system wiring.

Additional embodiments of the present invention relate generally to electrical control switches and, more particularly, to electrical control switches having an radio frequency identification (RFID) tag incorporated therein. The incorporation of the RFID tag into the control switch provides benefits in implementations of the switch as a remote limit switch or an intrinsic safety switch.

Electrical switches are used in motor vehicles as control switches for switching the motor vehicle lighting, the windshield wipers, the rear windshield heating, the cruise control functions, the internal central locking and other functions on and off. A number of such switches can be combined as control panels in the dashboard, in the center console or the like. In specialty vehicle markets—such as heavy trucks, agricultural equipment, and construction equipment, for example—many original equipment manufacturers (OEMs) produce custom dashboards for their customers. In doing so, the OEMs allow the customers to pick options as well as their associated switch locations. While such customization is desirable from the standpoint of the customer, such customization leads to significant overhead expenses for the OEMs with respect to managing customer options for the dashboards. That is, present methods of managing production for customer dashboards having customized options and associated switch locations requires separate drawings and wire harnesses for every vehicle manufactured. Furthermore, some OEMs may even install the wires for every option sold, but only connect the wires used with the individual customer dashboard order.

In the mix of switch functions, some switches provide input signals to a vehicle's microprocessor-based controller, often referred to as a body controller, or electronic controller unit (ECU), which receives the signal and makes logic decisions regarding how that function is to be performed or activated. Other switches are wired directly to their intended loads. Those switches providing an ECU input typically operate at very low current, typically in the range of 5 to 20 milliAmperes (mA), whereas direct-wired switches may handle loads up to 20 Amperes or more. Different contact materials are needed to accommodate these varying load ranges, as well as different sized wires and connectors. The arrangement or rearrangement of switches within the dashboard array is often limited in practice by the ability of the OEM to provide appropriate high current and low current wiring to support the desired functions. It is also common for OEMs to provide the same type of electrical connector and wires for all switch positions for economy and standardization, though the practice can result in a higher percentage of wiring errors at the time the vehicle is being assembled.

It is recognized that electrical control switches may be utilized in other environments beyond that of vehicle controls, and that electrical control switches may take a variety of other forms. Two common examples of electrical control switches include limit switches and intrinsic safety switches. With respect to limit switches, it is known that such switches are used in a variety of applications and environments because of their ruggedness, ease of installation, and reliability of operation, with the switches being operated by the motion of a machine part (e.g., the passing, positioning, and/or end of travel of an object) or presence of an object and are used for controlling machinery as part of a control system, for example. Limit switches may take a variety of forms, such as an electromechanical device that consists of an actuator mechanically linked to one or more contacts such that, when an object comes into contact with the actuator, the device operates the contacts to make or break an electrical connection. With respect to intrinsic safety circuits and switches, intrinsic safety circuits are circuits designed to provide for safe operation of electrical equipment in hazardous areas by limiting the energy available for ignition (i.e., operate with low currents and voltages). Areas with dangerous concentrations of flammable gases or dust are found in applications such as gas furnaces, petrochemical refineries and mines. A device termed intrinsically safe is designed to be incapable of producing heat or spark sufficient to ignite an explosive atmosphere. There are several considerations in designing intrinsically safe electronics devices: reducing or eliminating internal sparking, controlling component temperatures, and eliminating component spacing that would allow dust to short a circuit.

It is recognized that, in the use of limit switches in caustic environments (highly acidic, etc.), there is risk of wire corrosion, limited contact life, intermittent operation, etc., that can raise costs and compromise system operation. Also, in the use of limit switches in remote applications or in rotating applications (e.g., on the inside of a carousel), there can be extensive cost in making electrical connections to the limit switch, as the costs of running wire to a remote limit switch through conduit may be prohibitive and/or the cost and reliability of a slip ring required for wiring in a rotating application may be similarly prohibitive. It is also recognized that, in the use of intrinsic safety switches, special wiring and/or amplification may be required to limit energy levels in the intrinsic safety system, which leads to increased costs related to the system.

It would therefore be desirable to design a system that enables OEMs to reduce the cost of managing a custom dashboard. In doing so, the system and method would allow for dashboard customization without requiring the OEM to rewire/relocate the wire harnesses to accommodate the customization—thereby enabling vehicle OEMs to significantly reduce the engineering overhead and the wire count associated with a custom dashboard.

It would also therefore be desirable to provide a control switch useable in remote locations and/or in hazardous environments (i.e., caustic environments or environments requiring intrinsically safety operation) that overcomes the aforementioned drawbacks.

BRIEF DESCRIPTION OF THE INVENTION

Embodiments of the present invention provide a vehicle control switches that provides a self-identifying switch function. The switches may be placed in any of a number of locations consistent with a customer's desired switch customization requirement, while providing for the identification of a switch regardless of its location, such that switches can be placed in any position within a defined network on the vehicle without changing the switch's functionality or the system wiring.

Embodiments of the present invention also provide a control system for controlling operation of a field device located in a remote location or in a hazardous environment that requires intrinsically safe operation. The control system includes a switch having an radio frequency identification (RFID) tag associated therewith that provides for wireless communication to and from the switch.

In accordance with one aspect of the invention, a control system for controlling operation of a field device includes a switch having a switch contact movable between an off position and an activated position, a radio frequency identification (RFID) tag integrated with the switch and in selective communication with the switch based on the position thereof, an RFID reader configured to receive switch messages from the RFID tag that indicate an operational state of the switch, and a control circuit configured to receive switch messages from the RFID reader, the control circuit receiving the switch messages for purposes of controlling the field device.

In accordance with another aspect of the invention, a limit switch control system for controlling operation of a field device includes a limit switch including a switch contact movable between an off position and an activated position, the switch contact movable between the off position and the activated position responsive to a movement or positioning of the field device relative to the limit switch. The limit switch control system also includes a radio frequency identification (RFID) tag integrated with the limit switch, the RFID tag including thereon a unique identifier tied to a function of the limit switch in its activated position. The limit switch control system further includes an antenna integrated with the limit switch and selectively in operable communication with the RFID tag based on a position of the switch contact, wherein a communications path between the RFID tag and the antenna is formed by the switch contact when the limit switch is in the activated position, thereby causing the antenna to transmit a switch signal to an RFID reader remote from the limit switch, the switch signal including therein the unique identifier of the RFID tag.

In accordance with yet another aspect of the invention, an intrinsically safe control system for controlling operation of a field device includes a switch having a switch contact movable between an off position and an activated position, a radio frequency identification (RFID) tag integrated with the switch, and an antenna operable with the RFID tag to transmit switch messages indicative of an operational state of the switch, wherein movement of the switch between the off position and the activated position selectively provides a communications path between the RFID tag and the antenna. The intrinsically safe control system also includes a control circuit in operable communication with the switch via transmission of the switch messages thereto, with the switch messages causing the control circuit to control operation of the field device.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE INVENTION

Embodiments of the invention are directed to vehicle control switches having a self-identifying switch function, and a vehicle communications system for detecting the switches. The self-identification feature of the switches enables the placement of switches in any of a number of locations within a defined vehicle network consistent with a customer's desired switch customization requirement, while providing for the identification of a switch regardless of its location, such that switches can be placed in any position on the vehicle within that network without changing the switch's functionality or the system wiring.

Figure 1:
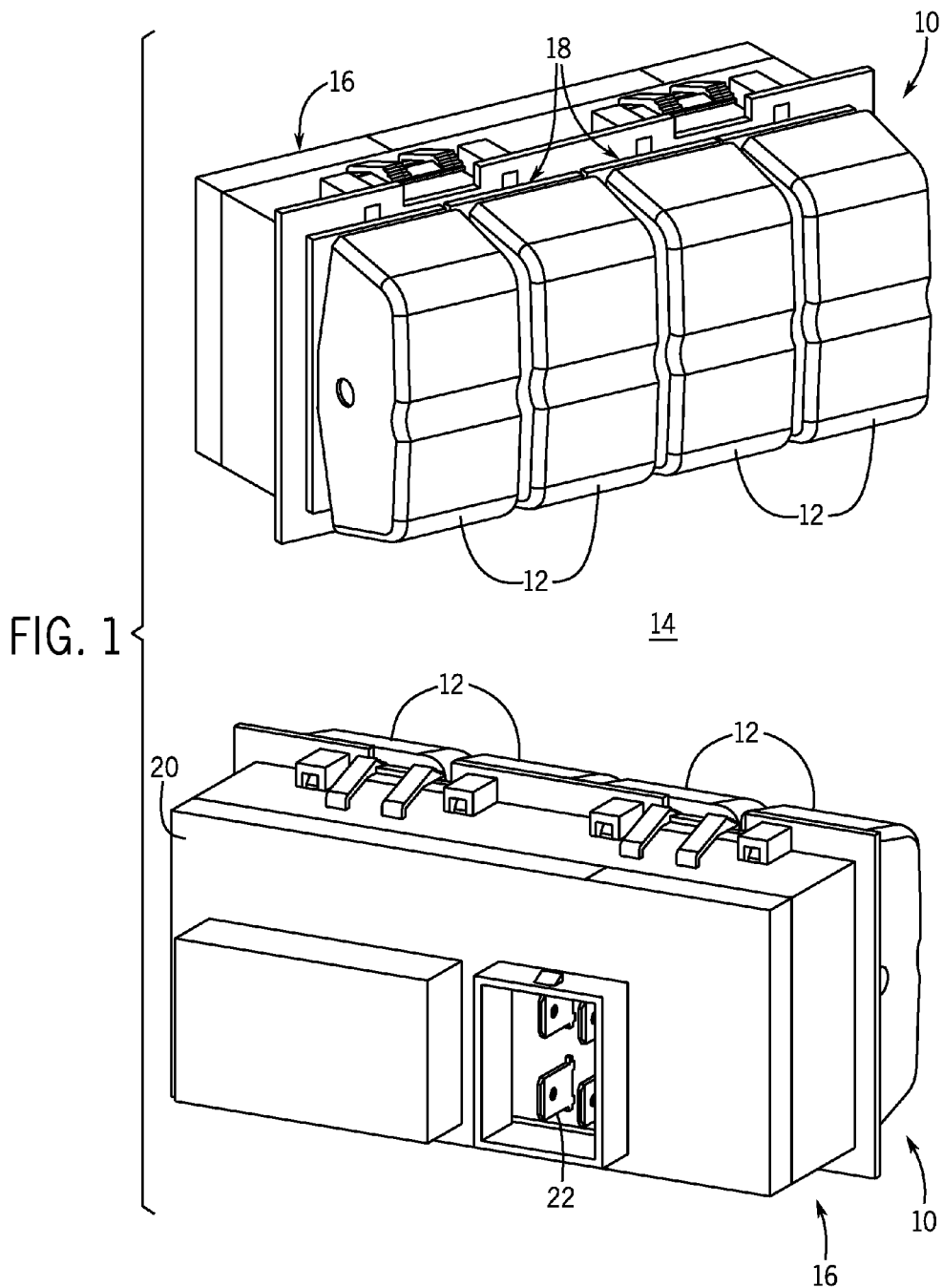
FIG. 1 shows front and rear views of a self-identifying vehicle switch module, according to an embodiment of the invention.

Referring to FIG. 1, the general structure of a switch module 10 having a plurality of switches 12 is shown according to an embodiment of the invention. The switch module 10 is incorporated as part of a dashboard 14 in a motor vehicle, for example in a commercial vehicle, such as a goods vehicle. An operator of the vehicle uses the switches 12 to operate various functions in the vehicle, such as for switching the motor vehicle lighting, the windshield wipers, the diesel fuel heating, or other specialized equipment on the vehicle. In the embodiment illustrated in FIG. 1, the switch module 10 comprises four switches 12; however, it is recognized that a greater or smaller number of switches 12 could be included in the module. For example, a switch module 10 could be provided having eight switches 12—arranged in a single row or in two rows of four, for example. While there is no limit on the number of switches 12 that can be included in switch module 10, it is recognized that for practical purposes—such as responsiveness and speed of switch functioning—the number of switches 12 in an individual module 10 will be limited to a reasonable number so as to maintain a minimum level of vehicle performance.

As further shown in FIG. 1, the switches 12 of switch module 10 are received within a module housing 16 that is fitted in the dashboard 14 of the motor vehicle. The housing 16 is formed as a generally hollow member configured to receive the individual switches 12 therein and includes mating features formed thereon, such as alignment tabs or slots 18, which enable mating of the switches 12 within the housing 16 in the correct orientation. A back surface 20 of the switch module 10 includes a power receptacle 22 formed thereon for enabling powering of the module.

According to embodiments of the invention, the switches 12 included in switch module 10 are configured as self-identifying switches. That is, each of the switches 12 includes data stored thereon regarding a unique address or identifier tying to the icon/function of the switch. Accordingly, the switches 12 may be placed in any of a number of locations in a module 10 and/or on the dashboard 14 consistent with a customer's desired switch customization requirement, while providing for the identification of a switch 12 regardless of its location, such that switches can be placed in any position within a defined network on the vehicle without changing the switch's functionality or the system wiring.

Figure 2:
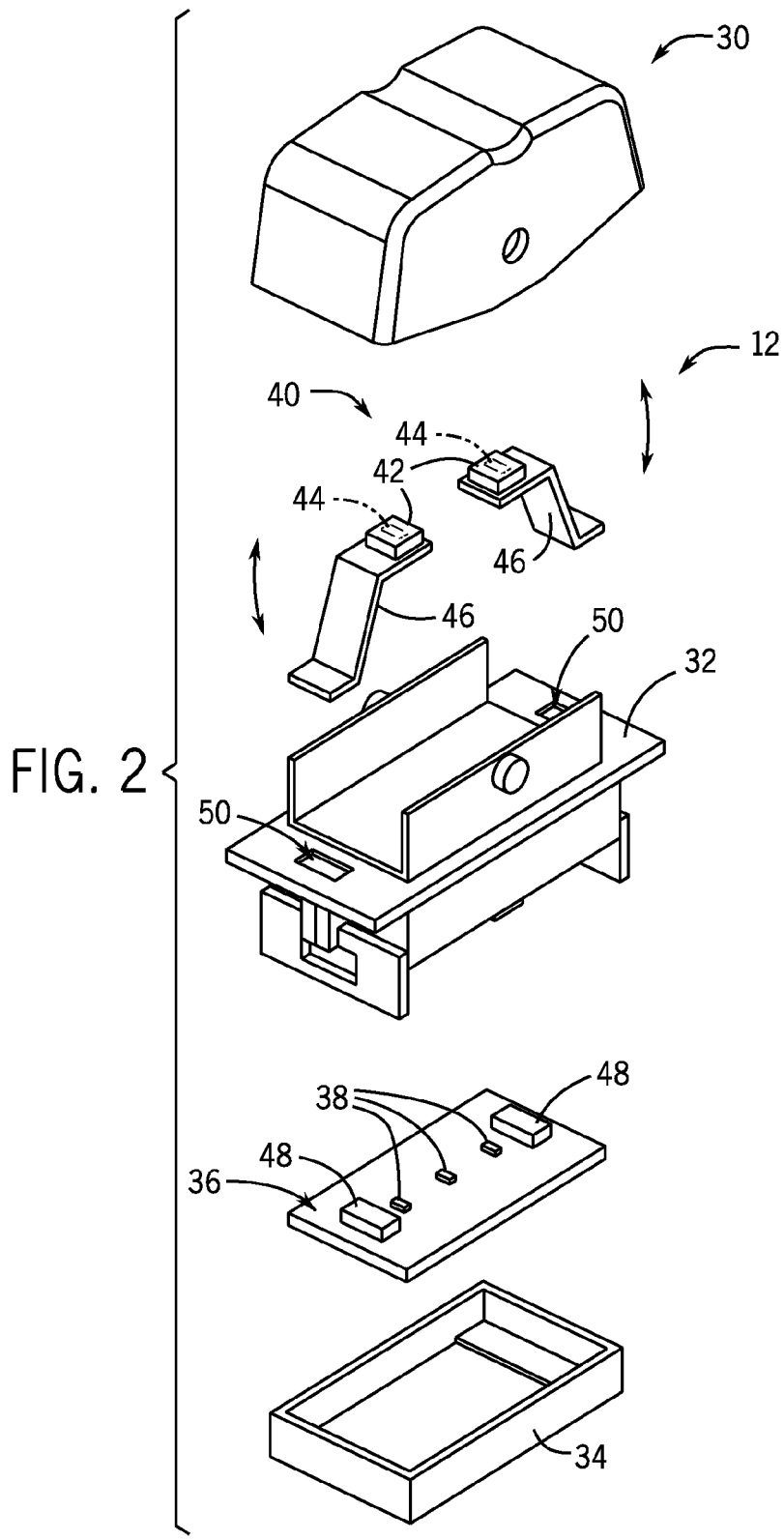
FIG. 2 is an exploded view of a switch included in the switch module of FIG. 1, according to an embodiment of the invention.

Referring now to FIG. 2, an exploded view of an individual switch 12 is shown in more detail. The switch 12 generally includes an operating member 30, a switch frame 32 on which the operating member is mounted, a rear plate 34, and a printed circuit board (PCB) 36 positioned between the switch frame 32 and the rear plate 34. According to an exemplary embodiment, the operating member 30 is in the form of a rocker button that is movable by an operator between an off/neutral position and one or more activated positions, with the rocker button 30 rotating relative to the switch frame 32 responsive to actuation of the button by the operator. In the embodiment of FIG. 2, the switch 12 is constructed as a rocker switch having a neutral position and two activated positions—a first activated position and a second activated position. If the user pushes one side of the rocker button 30, the rocker button 30 is moved to the first activated position and, if the user pushes the other side of the rocker button 30, the rocker button 30 is moved to the second activated position. In one embodiment, light emitting diodes (LEDs) 38 located on the PCB 36 provide illumination of graphic icons on the rockers 30 to provide a visual indication to the user of whether the rocker button 30 is in the neutral position, the first activated position or the second activated position.

Also included in the switch 12 is a radio-frequency identification (RFID) system 40 that includes at least one RFID tag 42, with each RFID tag 42 having data stored thereon regarding a unique identifier or address tying to the icon/function of the respective position of switch 12—such that the switch 12 may function as a self-identifying switch. For example, the identifying data stored on the RFID tags 42 may tie/identify the switch position as functioning to control headlights, hazard lights, windshield wipers, rear windshield heating, cruise control functions, or internal central locking, for example. According to the embodiment of the switch 12 provided in FIG. 2, the RFID system 40 is shown as including two RFID tags 42 therein—one RFID tag for each activated switch position—although it is recognized that only a single RFID tag 42 could be included in the switch 12. In one embodiment, the RFID tags 42 may be affixed to the rocker button 30 on an underside thereof, such as via an adhesive, snap fit engagement, or other suitable means.

Each of the RFID tags 42 contains an integrated circuit (IC) 44 for storing and processing information, modulating and demodulating an RF signal, and other specialized functions, as well as a non-volatile memory (not shown) for storing the tag information, and either fixed or programmable logic for processing the transmission and sensor data, respectively. In an embodiment where the RFID tags 42 are passive tags, i.e., the tags have no battery, the integrated circuit 44 also functions to collect DC power from radio energy transmitted by an RFID reader 56, although it is recognized that the RFID tags may instead be active tags or battery-assisted passive (BAP) tags, as will be explained in greater detail below.

For each RFID tag 42 in switch 12, a switch contact 46 (i.e., contact terminal) is provided that allows for the RFID tag 42 to selectively communicate with a corresponding antenna 48 that, according to one embodiment, is affixed to the PCB 36. That is, a switch contact 46 is electrically coupled to each RFID tag 42 and is movable between "opened" and "closed" positions responsive to actuation of the rocker button 30, such that the contact 46 will selectively provide for a communication path between the RFID tag 42 and its respective antenna 48 when moved to the closed position—with openings 50 being formed in frame 32 to provide for connection of the switch contacts 46 and the antennas 48. When a switch contact 46 is closed, its respective RFID tag 42 will transmit the data stored thereon—i.e., a unique address tying to the icon/function of the switch—to the antenna 48, with the antenna 48 then functioning to send out a wireless signal that includes this data—referred to hereafter as a "switch message." According to one embodiment of the invention, an antenna 48 is provided for each of the RFID tags 42, with each antenna 48 being in selective communication with its respective RFID tag 42; however, it is recognized that an alternative embodiment of the switch 12 could include only a single antenna 48 that would be utilized to broadcast signals for both of the RFID tags 42, with it being understood that no more than one of the RFID tags 42 would ever be in communication with the antenna 48 at any given time.

Figure 3:
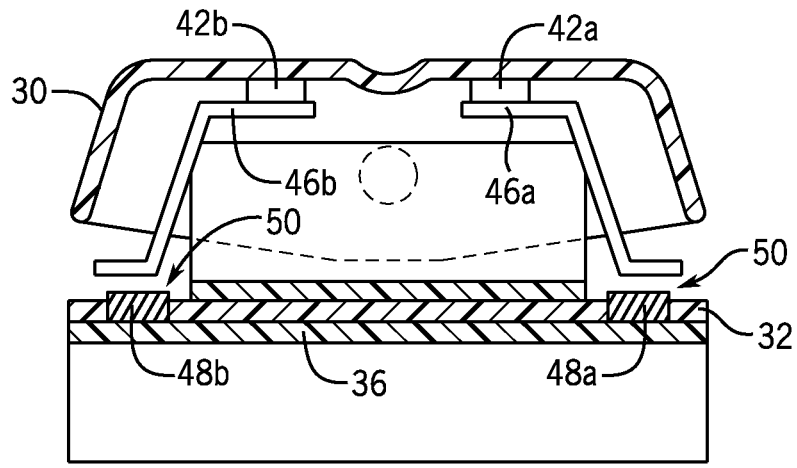
FIGS. 3-5 illustrate a cross-sectional view of the switch of FIG. 2, with the switch in a neutral position, first activated position, and second activated position, respectively.
Figure 4:
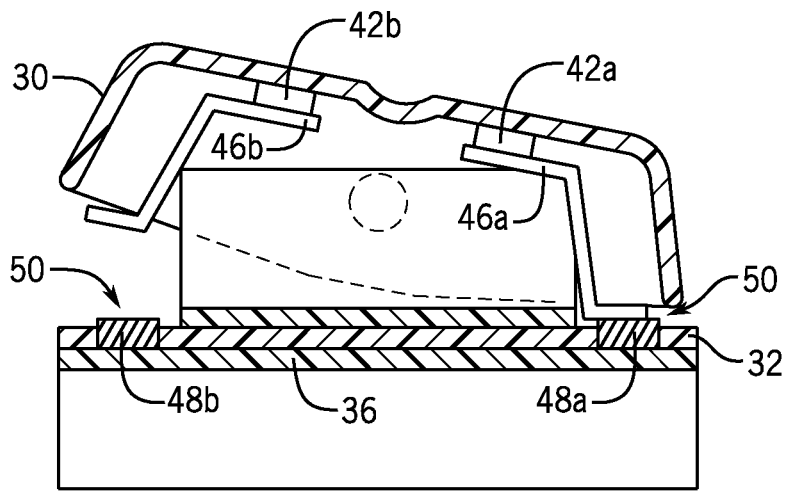
Figure 5:
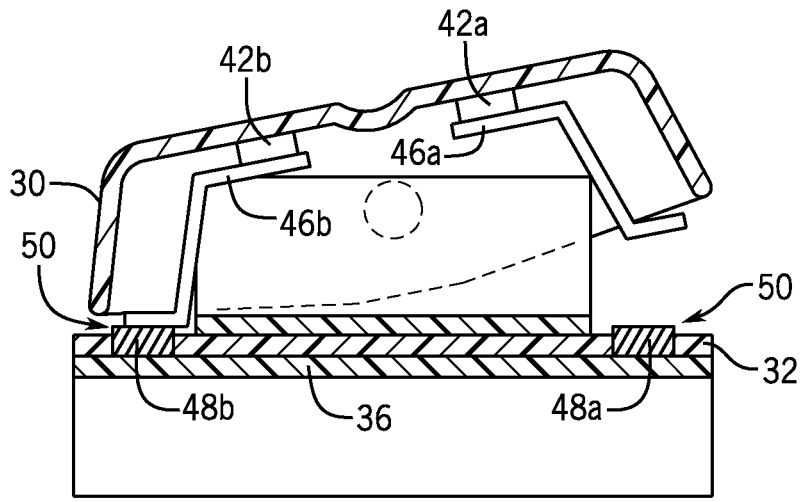

In operation of switch 12, the rocker button 30 is used in order to provide manual switching for the switch contacts 46. Referring to FIGS. 3-5, the switch is shown in each of the neutral position, first activated position and second activated position, with the positioning of the switch contacts 46 relative to antennas 48 being illustrated therein. As shown in FIG. 3, when the rocker button 30 is in the neutral position, then the two switch contacts 46a, 46b are in the switched-off state—separated from antennas 48a, 48b—such that no communication path is provided from the RFID tags 42a, 42b to their respective antennas 48a, 48b. As shown in FIG. 4, if the user pushes one side of the rocker button 30, the rocker button 30 is moved to a first activated position and, in consequence, a first RFID tag 42a and first switch contact 46a on the rocker button 30 are caused to translate downward such that the first switch contact 46a is electrically coupled to the first antenna 48a, such that the data stored on the RFID tag is provided to the antenna 48a and the antenna 48a transmits a wireless switch message that includes the data from the first RFID tag 42a. As shown in FIG. 5, in a second activated position of the rocker button 30, which is reached by pushing the other side of the rocker button 30, the second RFID tag 42b and second switch contact 46b are caused to translate downward such that the second switch contact 46b is electrically coupled to the second antenna 48b, such that the data stored on the RFID tag 42b is provided to the antenna 48b and the antenna 48b transmits a wireless switch message that includes the data from the second RFID tag 42b.

While the switches 12 in switch module 10 are shown and described in FIGS. 2-5 as being rocker switches having a neutral position and two activated positions, it is recognized that the switches 12 could also be constructed as rocker switches having only a neutral/off position and one activated/on position. In such an embodiment, only a single RFID tag 42 and switch contact 46 would be employed—with the switch contact 46 selectively connecting with an antenna 48 to provide a communication path between the RFID tag 42 and the antenna 48. Construction of a switch 12 as a pushbutton switch or toggle switch would similarly operate with there being only a single RFID tag 42 and switch contact 46, and a single respective antenna 48.

Figure 6:
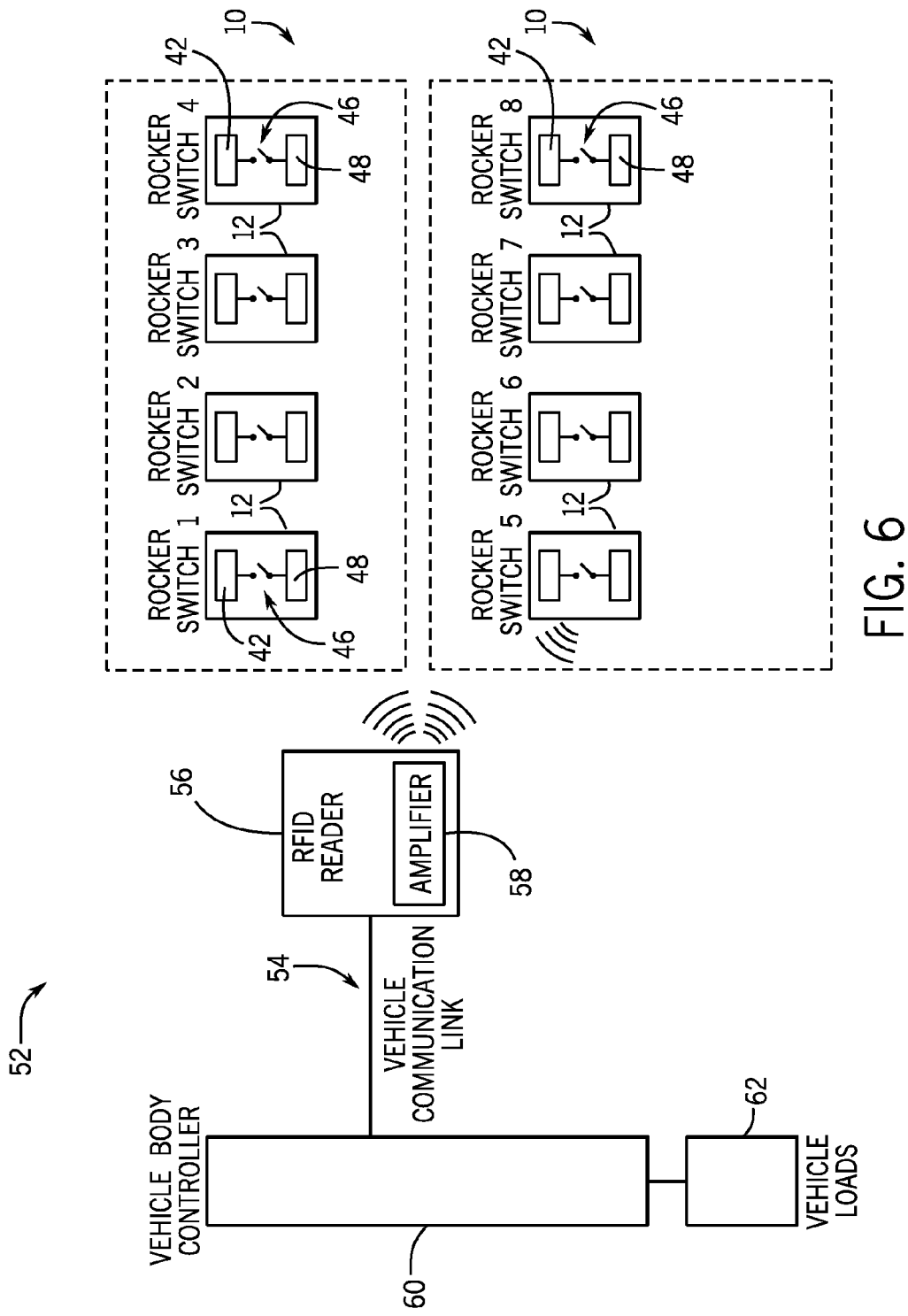
FIG. 6 is a schematic block diagram of a vehicle communication system that includes a plurality of self-identifying vehicle switches, according to an embodiment of the invention.

Referring now to FIG. 6, and with continued reference to FIGS. 1 and 2, a schematic diagram of a vehicle communication system 52 is shown according to an embodiment of the invention. The vehicle communication system 52 includes one or more switch modules 10 each having a plurality of switches 12 therein—such as shown and described in FIGS. 1 and 2—operatively connected to and in communication with a vehicle communication network or link 54, such as a CAN bus or LIN bus for example. That is, the switch modules 10 and switches 12 therein are multiplexed with the vehicle communication network or link 54 communication device (using a CAN or LIN protocol, for example) to interface with other devices on the vehicle.

To provide for communication between the switches 12 and the communication link 54, an RFID reader 56 is operably coupled to the communication link 54 that interacts with the switches 12 to receive information therefrom, with the RFID reader 56 being mountable on the vehicle chassis. In an exemplary embodiment, the RFID reader 56 and RFID tags 42 in switches 12 are provided as an Active Reader Passive Tag (ARPT) system—in which the RFID reader 56 transmits interrogator signals and receives authentication replies (in the form of switch messages) from passive RFID tags 42. In addition to interrogating the RFID tags 42 in order to receive authentication replies therefrom, the RFID reader 56 also functions to power/charge the RFID tags 42. For performing such a charging operation, the RFID reader 56 includes an antenna amplifier 58 that functions to selectively boost the strength of signals transmitted therefrom to the RFID tags 42, with a boosted "charging signal" being, for example, up to roughly a thousand times stronger than the interrogation signals transmitted by the RFID reader 56. The RFID tags 42 use the radio energy in the charging signals to charge components therein, such as the integrated circuit 44 of the RFID tag 42.

While the RFID tags 42 and RFID reader 56 are described above as an ARPT system in which the RFID reader 56 transmits interrogator signals and receives authentication replies from passive RFID tags 42, it is recognized that alternative embodiments could instead provide the RFID tags as active tags or battery-assisted passive (BAP) tags. When provided as active tags having an on-board battery, the RFID tags 42 periodically transmit switch messages out therefrom—i.e., transmit switch messages when their respective switch 12 is in an activated position and the RFID tag 42 is in communication with its antenna 48. When provided as BAP tags, the RFID tags 42 have a small battery on-board and are activated only when interrogated by the RFID reader 56.

In operation, the RFID reader 56 periodically scans the system 52 checking for the presence of RFID tags, with the RFID reader 56 transmitting an encoded radio signal to interrogate RFID tags 42 in the switches 12 of switch modules 10. The RFID reader 56 then detects a switch closure (i.e., a switch in an activated position) by detecting the presence of the RFID tags 42 responsive to the interrogation signal. A switch closure is only detected when the switch contact 46 is in a closed position that connects an antenna 48 to its respective RFID tag 42, with the closure of the switch contact 46 being based on the position of the rocker button 30 of the switch 12. Accordingly, the system logic used by the RFID reader 56 in interrogating the RFID tags 42 would be set forth simply as:

Switch contact closure is TRUE when the RFID reader reports the presence of the RFID tag.
Switch contact closure is FALSE when the RFID reader does not report the presence of the RFID tag.

Those RFID tags 42 that are connected to an antenna 48 by its respective switch contact 46 respond to the RFID reader 56 with a switch message that includes their identification and switch state information, with the RFID reader 56 receiving a switch message from each RFID tag 42 whose switch 12 is in an activated position. As each of the RFID tags 42 has an individual identification or serial number, the RFID reader 56 can discriminate among several RFID tags 42 that might be within the range of the RFID reader 56 and read them simultaneously.

After running the RFID scan, the switch messages received by the RFID reader 56 are provided to the vehicle communication link 54 and a serial message is sent on the communication link. The serial message contains the switch identifier and the switch state for each switch message received from the RFID tags 42. As shown in FIG. 3, the vehicle communication link 54 provides the serial message to a vehicle body controller 60 (i.e., CAN/LIN master controller), with the vehicle body controller 60 interpreting switch messages received from the switches 12—via RFID reader 56—and transmitting a command to the vehicle function/load 62, so as to cause the vehicle function/load to operate in a desired manner—such as sending a command to cause windshield wipers to turn-on.

According to embodiments of the invention, the switch modules 10 can operate within vehicle communication system 52 to identify the presence of a particular switch 12 and the switch's state. Thus, as indicated in FIG. 6 for example, any of "Rocker Switch 1" thru "Rocker Switch 8" could be individually identified to associate an individual identification to each switch 12 and a state of each switch 12. As indicated previously, each switch 12 contains a unique address/identifier associated with the switch function, with such address information being stored on the RFID tag(s) 42 included in the switch 12. The RFID reader 56 receives switch messages from the RFID tags 42 that contains the switch's address/identifier as well as the switch's logic state, and provides these messages in serial to the vehicle body controller 60, such that the vehicle body controller 60 interprets the switch messages for controlling/turning on an associated load/output 62.

Because each RFID tag 42 on a switch 12 contains a unique identifier and the RFID reader 56 receives signals from the RFID tags 42 that include these identifiers, an OEM can place a switch 12 in any position on a vehicle dashboard 14 without changing the switch's functionality. For example, swapping the positions of "Rocker Switch 2" with "Rocker Switch 7" would have no effect on the switches' functionality or the associated system/module wiring. Regardless of the location of Rocker Switch 2, for example, the RFID reader 56 would recognize that it is receiving a switch message from Rocker Switch 2 and that the switch is in either the first activated position or the second activated position, and would relay that information to the vehicle communication link 54 and turn on the appropriate load/output device 62 by way of the vehicle's body controller 60.

While embodiments described above make use of the RFID tag to provide a self-identifying vehicle control switch (provided on a vehicle dashboard) whose function and operational state is identifiable, it is recognized that additional embodiments of the invention may encompass other types of control systems and circuits that make use of RFID tags to provide for identification of an operational state of a switch. For example, an RFID tag may be incorporated into control systems or circuits that include limit switches and/or intrinsic safety switches in order to beneficially enable identification of an operational state of such switches.

With respect to limit switches, it is known that such switches are used in a variety of applications and environments because of their ruggedness, ease of installation, and reliability of operation, with the switches being operated by the motion of a machine part (e.g., the passing, positioning, and/or end of travel of an object) or presence of an object and are used for controlling machinery as part of a control system, for example. Limit switches may take a variety of forms, such as an electromechanical device that consists of an actuator mechanically linked to one or more contacts such that, when an object comes into contact with the actuator, the device operates the contacts to make or break an electrical connection.

Figure 7:
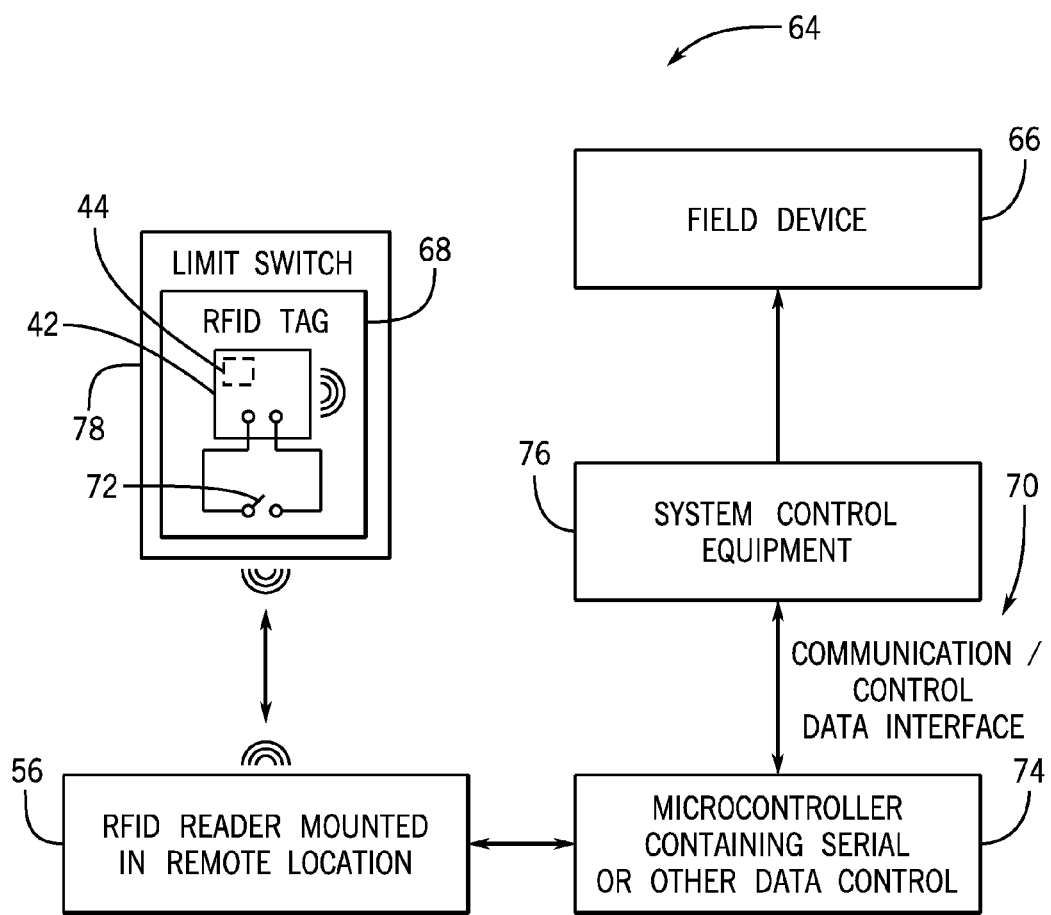
FIG. 7 is a schematic block diagram of a limit switch control system according to an embodiment of the invention.

Referring to FIG. 7, a schematic diagram of a limit switch control system 64 is shown according to an embodiment of the invention. The limit switch control system 64 is employed, for example, to prevent a field device 66 from moving beyond its normal stop position or operating range. The control system 64 of FIG. 7 includes a limit switch 68 and a control circuit 70 in communication therewith that is configured to control operation of the field device 66. According to embodiments of the invention, the limit switch 68 may, for example, be in the form of a spring loaded limit switch or a reed switch. The limit switch 68 is positioned so that its contact 72 opens when a feature/component of the field device 66 engages the limit switch 68, thereby opening limit switch 68. When the limit switch 68 opens, the change in switch state is provided to the control circuit 70 for purposes of controlling the field device 66, such as stopping movement of the field device 66, for example.

As further shown in FIG. 7, an RFID tag 42 is provided for the limit switch 68 that functions to provide for remote determination of a switch state (and thus the position of the movable field device) and provide information on the field device 66 (e.g., device control number, device name, type, manufacturer name, manufactured date, etc.). That is, in certain applications or operating environments, it may be desirable to incorporate an RFID tag 42 into the limit switch 68. As one example, in the use of limit switches 68 in caustic environments (highly acidic, etc.) there is risk of wire corrosion, limited contact life, intermittent operation, etc., that can raise costs and compromise system operation. As additional examples, in remote applications or in rotating applications (e.g., on the inside of a carousel), there can be extensive cost in making electrical connections to the limit switch 68, as the costs of running wire to a remote limit switch through conduit may be prohibitive and/or the cost and reliability of a slip ring required for wiring in a rotating application may be similarly prohibitive.

The RFID tag 42 contains an integrated circuit (IC) 44 for storing and processing information, modulating and demodulating an RF signal, and other specialized functions, as well as a non-volatile memory (not shown) for storing the tag information, and either fixed or programmable logic for processing the transmission and sensor data, respectively. In an embodiment where the RFID tags 42 are passive tags, i.e., the tags have no battery, the integrated circuit 44 also functions to collect DC power from radio energy transmitted by an RFID reader 56, although it is recognized that the RFID tags may instead be active tags or battery-assisted passive (BAP) tags. In an embodiment where the RFID tag 42 is an active tag, the tag incorporates a transceiver connecting a battery with the antenna so as to enable the tag to communicate with an RFID reader 56 at a greater distance.

For the RFID tag 42 associated with limit switch 68, it is seen that the RFID tag 42 selectively communicates with a corresponding antenna 48 based on the positioning of the switch contact 72 (i.e., contact terminal) of limit switch 68. That is, the switch contact 72 is movable between "opened" and "closed" positions responsive to actuation of the limit switch 68 in order to selectively provide for a communication path between the RFID tag 42 and its respective antenna 48 when moved to the closed position. When the switch contact 72 is closed, the RFID tag 42 will transmit to the antenna 48, with the antenna 48 then functioning to send out a wireless signal that includes the switch state of the limit switch 68—and thus consequently the position/state of the field device 66. The wireless signal is received by an RFID reader 56 that is in operable communication with the antenna 48 and located remotely therefrom, with the RFID reader being operably coupled to the control circuit 70 to provide information thereto regarding the operational state of the limit switch. In one embodiment, the control circuit may comprise a microcontroller 74 and system control equipment 76, with the RFID reader 56 providing a data message to the microcontroller 74 (such as in the form of serial communication, TTL communication, or another suitable communication mode/format) that contains a limit switch identifier and the switch state for a switch message received from the RFID tag 42. The microcontroller 74 may then transfer data to the system control equipment 76 via a communication or control data interface (i.e., communications link), in order to provide for control of the field device 66 via the system control equipment 76.

In an embodiment where the limit switch control system 64 is employed in a caustic environment or exposed to inclement operating conditions, a potting 78 may be provided about the limit switch 68 to provide protection to the limit switch 68 and its associated RFID tag 42 and antenna 48. The potting 78 serves to protect the switch contact 72 and thus improve reliability and life thereof and it is recognized that implementation of the RFID tag 42 with the limit switch 68 and the wireless communication provided thereby (as opposed to wiring running to the switch) allows for the limit switch 68 to be completely sealed within the potting 78. In an embodiment where such a potting 78 is provided, it is recognized that a limit switch 68 in the form of a spring loaded limit switch or a reed switch would be particularly well suited.

With respect to intrinsic safety circuits and switches, intrinsic safety circuits are circuits designed to provide for safe operation of electrical equipment in hazardous areas by limiting the energy available for ignition (i.e., operate with low currents and voltages). Areas with dangerous concentrations of flammable gases or dust are found in applications such as gas furnaces, petrochemical refineries and mines. A device termed intrinsically safe is designed to be incapable of producing heat or spark sufficient to ignite an explosive atmosphere. There are several considerations in designing intrinsically safe electronics devices: reducing or eliminating internal sparking, controlling component temperatures, and eliminating component spacing that would allow dust to short a circuit.

Figure 8:
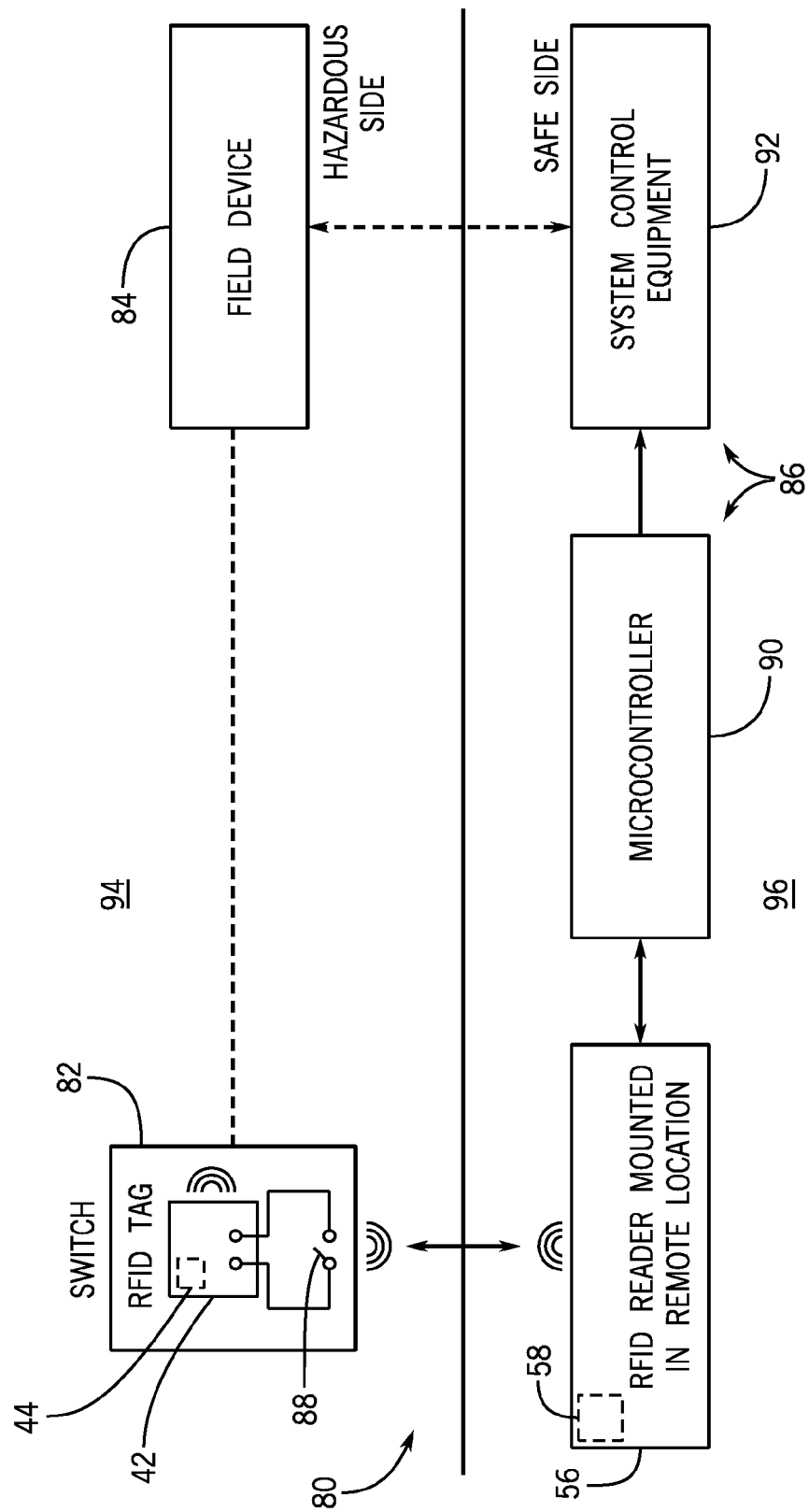
FIG. 8 is a schematic block diagram of an intrinsic safety control system according to an embodiment of the invention.

Referring now to FIG. 8, an intrinsic safety control system 80 is shown according to an embodiment of the invention. The safety circuit 80 includes a switch 82—in the form of a hand operated switch or a limit switch, for example—used to sense a condition of or control operation of a field device 84 and a control circuit 86 in communication therewith that is configured to control operation of the field device 84. The limit switch 68 includes a switch contact 88 that is opened/closed manually (when a hand operated switch) or that is opened closed responsive to a position or state of the field device 84 (when a limit switch) 68.

The position/state of the switch 82 in its opened or closed position is provided to the control circuit 86 for purposes of controlling the field device 84 and, as shown in FIG. 8, communication of such information is provided to the control circuit wirelessly. An RFID tag 42 is provided for the switch 82 (and incorporated therein) that functions to provide for remote determination of a switch state (and thus the position/state of the field device) and provide information on the field device 84 (e.g., device control number, device name, type, manufacturer name, manufactured date, etc.). The RFID tag 42 contains an integrated circuit (IC) 44 for storing and processing information, modulating and demodulating an RF signal, and other specialized functions, as well as a non-volatile memory (not shown) for storing the tag information, and either fixed or programmable logic for processing the transmission and sensor data, respectively. The RFID tag 42 selectively communicates with a corresponding antenna 48 based on the positioning of the switch contact 88 (i.e., contact terminal) of the switch 82. That is, the switch contact 88 is movable between "opened" and "closed" positions responsive to actuation of the switch 82 in order to selectively provide for a communication path between the RFID tag 42 and its respective antenna 48 when moved to the closed position. When the switch contact 88 is closed, the RFID tag 42 will transmit to the antenna 48, with the antenna 48 then functioning to send out a wireless signal that includes the switch state of the switch 82—and thus consequently the position/state of the field device 84.

The wireless signal is received by an RFID reader 56 that is in operable communication with the antenna 48 and located remotely therefrom, with the RFID reader being operably coupled to the control circuit 86 to provide information thereto regarding the operational state of the switch 82. In one embodiment, the control circuit may comprise a microcontroller 90 and system control equipment 92, with the RFID reader 56 providing a data message to the microcontroller 90 that contains a switch identifier and the switch state for a switch message received from the RFID tag 42. The microcontroller 90 may then transfer data to the system control equipment 92 via a communication or control data interface (i.e., communications link), in order to provide for control of the field device 84 via the system control equipment 92.

As shown in FIG. 8, the switch 82 is located in a hazardous environment 94 in which intrinsic safety precautions must be undertaken—such as an environment where gas fumes, hydrogen, or other ignitable/flammable gasses/materials are present. Meanwhile, the RFID reader 56 (and an antenna amplifier 58 therein) and control circuit 86 are located in a "safe" environment 96—such as in a remote location far from the intrinsic safety control system 80. In a hazardous location/environment, the power in or provided to the RFID tag 42 is limited such that it remains below prescribed voltage and current intrinsic safety limits. The incorporation of the RFID tag 42 and antenna 48 in the switch 82 allows for isolation of the switch and the elimination of wiring thereto that could short out and causing an arc in the hazardous environment 94.

Beneficially, use of the switch 82 and associated RFID tag 42 (and antenna 48) in the intrinsic safety control system 80 may negate the need for any special wiring and/or amplification to limit energy levels that is typically associated with existing safety circuits. Accordingly use of a switch 82 with an associated RFID tag 42 can reduce overall cost of the intrinsic safety control system 80.

Therefore, according to one embodiment of the present invention, a control system for controlling operation of a field device includes a switch having a switch contact movable between an off position and an activated position, a radio frequency identification (RFID) tag integrated with the switch and in selective communication with the switch based on the position thereof, an RFID reader configured to receive switch messages from the RFID tag that indicate an operational state of the switch, and a control circuit configured to receive switch messages from the RFID reader, the control circuit receiving the switch messages for purposes of controlling the field device.

According to another embodiment of the present invention, a limit switch control system for controlling operation of a field device includes a limit switch including a switch contact movable between an off position and an activated position, the switch contact movable between the off position and the activated position responsive to a movement or positioning of the field device relative to the limit switch. The limit switch control system also includes a radio frequency identification (RFID) tag integrated with the limit switch, the RFID tag including thereon a unique identifier tied to a function of the limit switch in its activated position. The limit switch control system further includes an antenna integrated with the limit switch and selectively in operable communication with the RFID tag based on a position of the switch contact, wherein a communications path between the RFID tag and the antenna is formed by the switch contact when the limit switch is in the activated position, thereby causing the antenna to transmit a switch signal to an RFID reader remote from the limit switch, the switch signal including therein the unique identifier of the RFID tag.

According to yet another embodiment of the present invention, an intrinsically safe control system for controlling operation of a field device includes a switch having a switch contact movable between an off position and an activated position, a radio frequency identification (RFID) tag integrated with the switch, and an antenna operable with the RFID tag to transmit switch messages indicative of an operational state of the switch, wherein movement of the switch between the off position and the activated position selectively provides a communications path between the RFID tag and the antenna. The intrinsically safe control system also includes a control circuit in operable communication with the switch via transmission of the switch messages thereto, with the switch messages causing the control circuit to control operation of the field device.

The present invention has been described in terms of the preferred embodiment, and it is recognized that equivalents, alternatives, and modifications, aside from those expressly stated, are possible and within the scope of the appending claims.

What is claimed is:

1. A control system for controlling operation of a field device, the control system comprising:
   a switch having a switch contact movable between an off position and an activated position;
   a radio frequency identification (RFID) tag integrated with the switch and in selective communication with the switch based on the position thereof;
   an RFID reader configured to receive switch messages from the RFID tag that indicate an operational state of the switch;
   a control circuit configured to receive switch messages from the RFID reader, the control circuit receiving the switch messages for purposes of controlling the field device; and an antenna integrated with the switch and selectively in operable communication with the RFID tag based on the position of the switch contact;

wherein the switch contact forms a communications path between the RFID tag and the antenna when in the activated position; and wherein the antenna generates a switch message for transmission to the RFID reader when the communications path is formed between the RFID tag and the antenna.

2. The control system of claim 1 wherein the switch comprises a limit switch whose switch contact moves between the off position and the activated position based on a movement of the field device relative to the limit switch.

3. The control system of claim 2 wherein the limit switch comprises a spring loaded limit switch or a reed switch.

4. The control system of claim 1 further comprising a potting housing the switch and the RFID tag, so as to protect the switch and the RFID tag from a caustic environment.

5. The control system of claim 1 wherein the control system comprises an intrinsically safe control system, with the switch and the RFID tag being located in a hazardous environment and the RFID reader and control circuit being located in an intrinsically safe environment.

6. The control system of claim 5 wherein power in or provided to the RFID tag is limited such that it remains below prescribed voltage and current intrinsic safety limits.

7. The control system of claim 1 wherein the RFID reader transmits interrogator signals to the RFID tag, with the RFID tag generating switch messages responsive to the interrogator signals.

8. The control system of claim 1 wherein the RFID tag includes thereon a unique identifier tied to a function of the switch, with each switch message received by the RFID reader including the unique identifier of the RFID tag.

9. A limit switch control system for controlling operation of a field device, the limit switch control system comprising:

a limit switch including a switch contact movable between an off position and an activated position, the switch contact movable between the off position and the activated position responsive to a movement or positioning of the field device relative to the limit switch;

a radio frequency identification (RFID) tag integrated with the limit switch, the RFID tag including thereon a unique identifier tied to a function of the limit switch in its activated position; and an antenna integrated with the limit switch and selectively in operable communication with the RFID tag based on a position of the switch contact;

wherein a communications path between the RFID tag and the antenna is formed by the switch contact when the limit switch is in the activated position, thereby causing the antenna to transmit a switch signal to an RFID reader remote from the limit switch, the switch signal including therein the unique identifier of the RFID tag.

10. The limit switch control system of claim 9 wherein the limit switch comprises a spring loaded limit switch or a reed switch.

11. The limit switch control system of claim 9 further comprising a potting housing the limit switch, the RFID tag and the antenna so as to protect the limit switch, the RFID tag and the antenna from a caustic environment.

12. The limit switch control system of claim 9 wherein the RFID tag comprises an active tag configured to communicate with the RFID reader from a remote location.

13. The limit switch control system of claim 10 wherein the switch signal transmitted to the RFID reader from the RFID tag comprises a data message transmittable on a communications link connected to the RFID reader.

14. An intrinsically safe control system for controlling operation of a field device, the intrinsically safe control system comprising:

a switch having a switch contact movable between an off position and an activated position;

a radio frequency identification (RFID) tag integrated with the switch;

an antenna operable with the RFID tag to transmit switch messages indicative of an operational state of the switch, wherein movement of the switch between the off position and the activated position selectively provides a communications path between the RFID tag and the antenna;

a control circuit in operable communication with the switch via transmission of the switch messages thereto, with the switch messages causing the control circuit to control operation of the field device.

15. The intrinsically safe control system of claim 14 further comprising an RFID reader configured to:

receive switch messages from the antenna and the RFID tag based on actuation of the switch to the activated position; and transmit the switch messages to the control circuit.

16. The intrinsically safe control system of claim 14 wherein the switch, RFID tag and antenna are located in a hazardous environment and the RFID reader and control circuit ate located in an intrinsically safe environment, with power in or provided to the RFID tag being limited such that it remains below prescribed voltage and current intrinsic safety limits.

17. The intrinsically safe control system of claim 14 wherein the RFID tag includes thereon a unique identifier tied to a function of the switch, with each switch message received by the RFID reader including the unique identifier of the RFID tag.

18. The intrinsically safe control system of claim 14 wherein the switch comprises a limit switch whose switch contact moves between the off position and the activated position based on a movement of the field device relative to the limit switch.

* * * * *

UNITED STATES PATENT AND TRADEMARK OFFICE
CERTIFICATE OF CORRECTION

| | | |
|---|---|---|
| PATENT NO. | : 9,514,899 B2 | Page 1 of 1 |
| APPLICATION NO. | : 14/697801 | |
| DATED | : December 6, 2016 | |
| INVENTOR(S) | : Blackwood | |

It is certified that error appears in the above-identified patent and that said Letters Patent is hereby corrected as shown below:

In the Claims

Column 14, Line 43 (Claim 16), delete "circuit ate" and substitute therefore -- circuit are --.

Signed and Sealed this
Twenty-eighth Day of February, 2017

Michelle K. Lee
*Director of the United States Patent and Trademark Office*